(12) United States Patent
Dey

(10) Patent No.: US 7,764,385 B1
(45) Date of Patent: Jul. 27, 2010

(54) FINE ALIGNMENT OF A LARGE SEGMENTED MIRROR

(75) Inventor: Thomas William Dey, Springwater, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 240 days.

(21) Appl. No.: 11/894,437

(22) Filed: Aug. 21, 2007

(51) Int. Cl.
G01B 11/02 (2006.01)
G01N 21/45 (2006.01)

(52) U.S. Cl. ...................................... 356/518; 356/508
(58) Field of Classification Search ................. 356/508, 356/518
See application file for complete search history.

(56) References Cited

U.S. PATENT DOCUMENTS

| | | | |
|---|---|---|---|
| 4,969,737 A | 11/1990 | Humbel et al. | |
| 4,979,819 A | 12/1990 | Humbel et al. | |
| 4,993,831 A | 2/1991 | Vandenberg et al. | |
| 5,004,337 A | 4/1991 | Dey | |
| 5,020,905 A * | 6/1991 | Dey et al. | 356/124 |
| 5,022,753 A | 6/1991 | Dey | |
| 6,885,501 B1 | 4/2005 | Popil | |
| 6,963,405 B1 | 11/2005 | Wheel et al. | |

FOREIGN PATENT DOCUMENTS

WO    WO 9110925 A1 *  7/1991

* cited by examiner

Primary Examiner—Patrick J Connolly
(74) Attorney, Agent, or Firm—RatnerPrestia

(57) ABSTRACT

A system for aligning a segmented mirror includes a source of radiation directed along a first axis to the segmented mirror and a beamsplitter removably inserted along the first axis for redirecting radiation from the first axis to a second axis, substantially perpendicular to the first axis. An imaging array is positioned along the second axis for imaging the redirected radiation, and a knife-edge configured for cutting the redirected radiation is serially positioned to occlude and not occlude the redirected radiation, effectively providing a variable radiation pattern detected by the imaging array for aligning the segmented mirror.

21 Claims, 12 Drawing Sheets

FINE ALIGNMENT OF A LARGE SEGMENTED MIRROR

STATEMENT REGARDING FEDERALLY SPONSORED RESEARCH

The invention described herein was made in the performance of work under NASA Contract No. NAS5-02200 and is subject to the provisions of Section 305 of the National Aeronautics and Space Act of 1958 (42 U.S.C. 2457).

FIELD OF THE INVENTION

The present invention relates to a system and method for testing imaging devices. More specifically, the present invention relates to the alignment of a large segmented mirror to a reference axis originating from a radiation source.

BACKGROUND OF THE INVENTION

U.S. Pat. No. 4,969,737 issued on Nov. 13, 1990 to Thomas W. Dey (co-inventor) discloses a Foucault knife-edge test for an objective or imaging device. The entire disclosure of this patent is incorporated herein by reference.

As disclosed therein and as shown in FIG. 1, optical assembly 10 demonstrates the basic principles of the Foucault knife-edge test. The assembly 10 includes a conventional imaging device, i.e. lens 12, comprising a pair of optical surfaces 14 and 16, radiation source 18, collector lens 20, and conventional photodetector 22 comprising the human eye. The components of assembly 10 are aligned to reference axis 24.

For optical assembly 10, one may employ the knife-edge test for qualitatively detecting (at eye/photodetector 22) the presence of transverse aberrations that may have been introduced into assembly 10 by lens optical surfaces 14 and 16. Accordingly, knife-edge 26 may be gradually introduced into assembly 10 (shown by way of the staggered arrows in FIG. 1), so that knife-edge 26 sequentially cuts and blocks the image of radiation source 18 at a plane of convergence 28. This action, in turn, removes source rays from their expected trajectories, so that a variable intensity pattern may be registered by the eye. Finally, a comparison of this intensity pattern with a theoretical intensity pattern for an ideal optical surface may become a qualitative measure of the presence of transverse aberrations introduced by optical surfaces 14 and 16.

Optical assembly 10 may be modified to obtain a quantitative interpretation of the Foucault knife-edge test. FIG. 2 shows the basic Foucault assembly 10 of FIG. 1, but modified to help realize quantitative interpretations of the knife-edge test. It is first noted that the eye has been replaced by a conventional photodetector 30. For example, photodetector 30 may comprise a matrix (m×n) array of charge coupled devices (CCD) where m is preferably from 64 to 1024, and n is preferably from 64 to 1024. The photodetector device 30 collects the radiation images by imaging device 12 under test, and provides, for each element in the matrix, a value proportional to the radiation intensity at that element. FIG. 2 shows that the outputs of photodetector 30 may be fed along line 32 to a conventional computing means 34.

Turning next to U.S. Pat. No. 5,020,905, issued on Jun. 4, 1991 to Thomas W. Dey, application of a Foucault knife-edge test to a segmented mirror is described. The entire disclosure of this patent is incorporated herein by reference. As disclosed therein and as shown in FIG. 3, segmented optic 38 includes a segmented mirror comprising two physically de-coupled, monolithic mirror sections 40 and 42. An individual and disjoint entrance pupil contribution by each of the physically de-coupled, monolithic mirror sections 40 and 42 aggregates in sum to form a common entrance pupil 36, i.e. entrance pupil 36 is developed over the entire surface of segmented optic 38.

The segmented optic 38 of FIG. 3, more particularly, may include an aluminized reflective coating on a Pyrex glass substrate. Here, segmented optic 38 has an overall diameter of approximately 125 mm, and a radius of curvature of approximately 2000 mm.

The Foucault testing of segmented optic 38 may proceed, with reference to assembly 10 of FIG. 1, mutatis mutandis, the required necessary changes being that of (1) replacing lens 12 of FIG. 1 with that of segmented optic 38 of FIG. 3, and (2) re-locating radiation source 18 to accommodate the reflective properties of mirror sections 40 and 42.

The Foucault testing of segmented optic 38 works by reconstructing, or emulating, an idealized monolithic mirror, by using Foucault determined data derived from sections 40 and 42, to align them into correspondence with the idealized monolithic mirror. Note that the Foucault determined data may be qualitative (for example when photodetector 22 of FIG. 1 includes the human eye). It is possible that the segmented optic 38 may induce an intensity pattern at the eye, in which the intensity pattern has inherent ambiguities, namely an ambiguity as to which of the two mirror sections 40 or 42 is indeed the source of an optical aberration. For this situation, one may employ the quantitative Foucault techniques described with respect to assembly 10 of FIG. 2.

Large segmented mirrors, for example segmented concave mirrors used as a primary mirror of an imaging telescope, are significantly misaligned in their initial deployment state. These segmented mirrors must be aligned to properly capture a light beam from an interferometer. Once aligned, the light beam from the interferometer may be used to interrogate (or test) the primary mirror at the mirror's center of curvature.

The segments of the primary mirror must be registered to extreme accuracy in order for the mirror to deliver image quality comparable to that of an equivalent monolithic mirror. Accordingly, the segments of the mirror are mechanically tip-tilted relative to each other, in order to achieve an ideal mirror configuration.

The present invention addresses a solution to the problem of how to align a large segmented mirror and achieve an accuracy sufficient for interrogation by an interferometer.

SUMMARY OF THE INVENTION

To meet this and other needs, and in view of its purposes, the present invention provides a system for aligning a segmented mirror including a source of radiation directed along a first axis to the segmented mirror and a beamsplitter removably inserted along the first axis for redirecting radiation from the first axis to a second axis, substantially perpendicular to the first axis. Also included is an imaging array positioned along the second axis for imaging the redirected radiation, and a knife-edge configured for cutting the redirected radiation. The knife-edge is serially positioned to occlude or not occlude the redirected radiation, effectively providing a variable radiation pattern detected by the imaging array for aligning the segmented mirror.

The beamsplitter, the imaging array and the knife-edge are integrated into a housing configured for removably inserting the beamsplitter along the first axis. The knife edge is mechanically coupled to a translation stage configured to move the knife edge in a plane perpendicular to the second axis. Also included is a focusing objective for focusing the radiation directed along the first axis onto a point on the first axis located between the beamsplitter and the focusing objective. Further included is a null assembly positioned along the first axis, and located between the beamsplitter and the segmented mirror, that is configured to receive radiation from the source and reflect the radiation toward the segmented mirror. The position of the source of radiation is adjustable along a length of the first axis, based on the variable radiation pattern detected by the imaging array.

Another embodiment of the present invention is a Foucault knife-edge test assembly including a source of radiation directed along a primary axis to a segmented mirror, a beamsplitter removably inserted along the primary axis for redirecting radiation from the primary axis to the Z-axis and forming the beam of radiation, and a knife-edge having an opaque surface in an X, Y plane including V-shaped edges. Each edge is configured to cut the beam of radiation along the Z-axis, with adjoining edges of the V-shaped edges forming a series of successive apexes that are serially positioned to occlude or not occlude the beam of radiation, effectively providing a variable radiation pattern detected by the imaging array for aligning the segmented mirror.

In yet another embodiment of the present invention, a segmented mirror is aligned by directing radiation from a source along a first axis to the segmented mirror and temporarily positioning a beamsplitter along the first axis to redirect radiation from the first axis to a second axis perpendicular to the first axis. Then, by serially positioning a knife-edge to cut the redirected radiation along the second axis and imaging radiation along the second axis after the radiation is cut by the knife-edge, a variable radiation pattern detected by the imaging array is used to align the segmented mirror.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
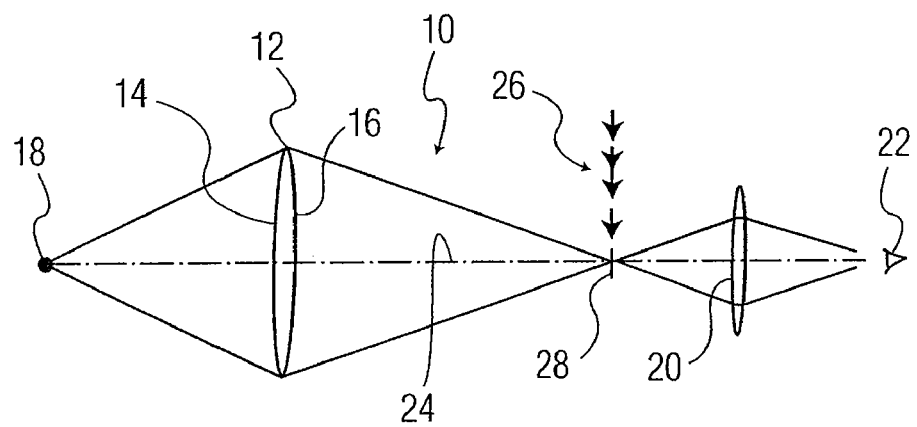
FIG. 1 shows a prior art optical assembly for using a Foucault knife-edge test.
Figure 2:
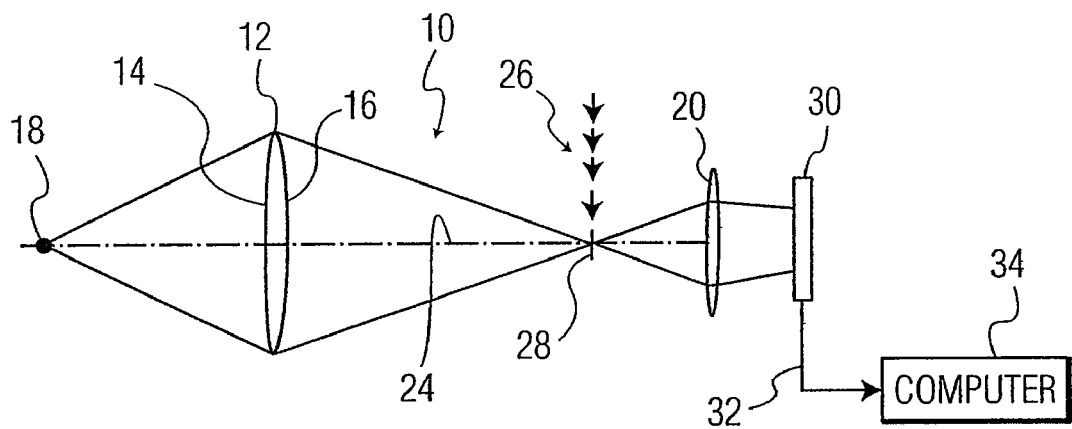
FIG. 2 shows a prior art optical assembly for using a Foucault knife-edge test including a photodetector.
Figure 3:
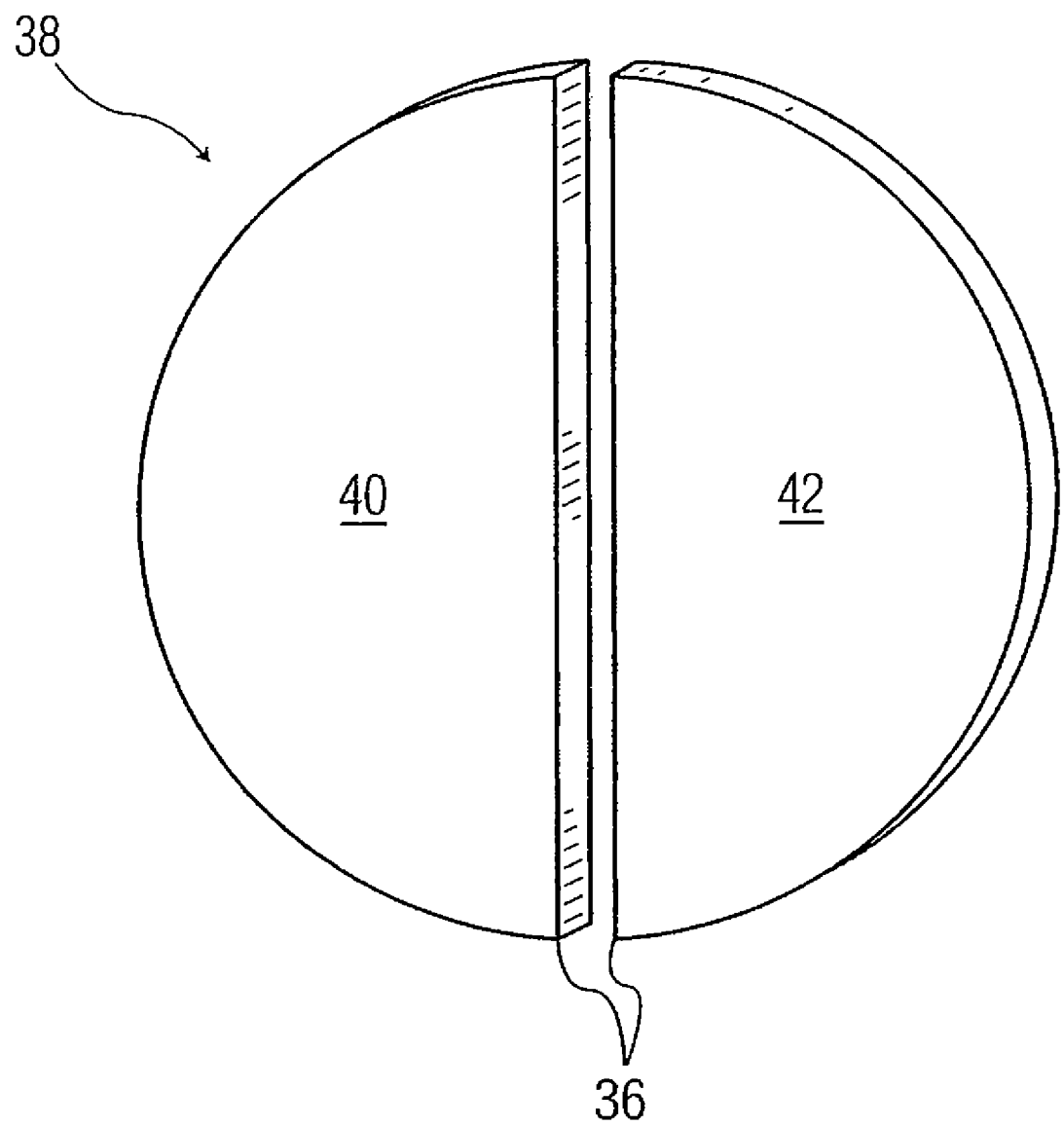
FIG. 3 shows a prior art segmented optic including a segmented mirror.
Figure 4:
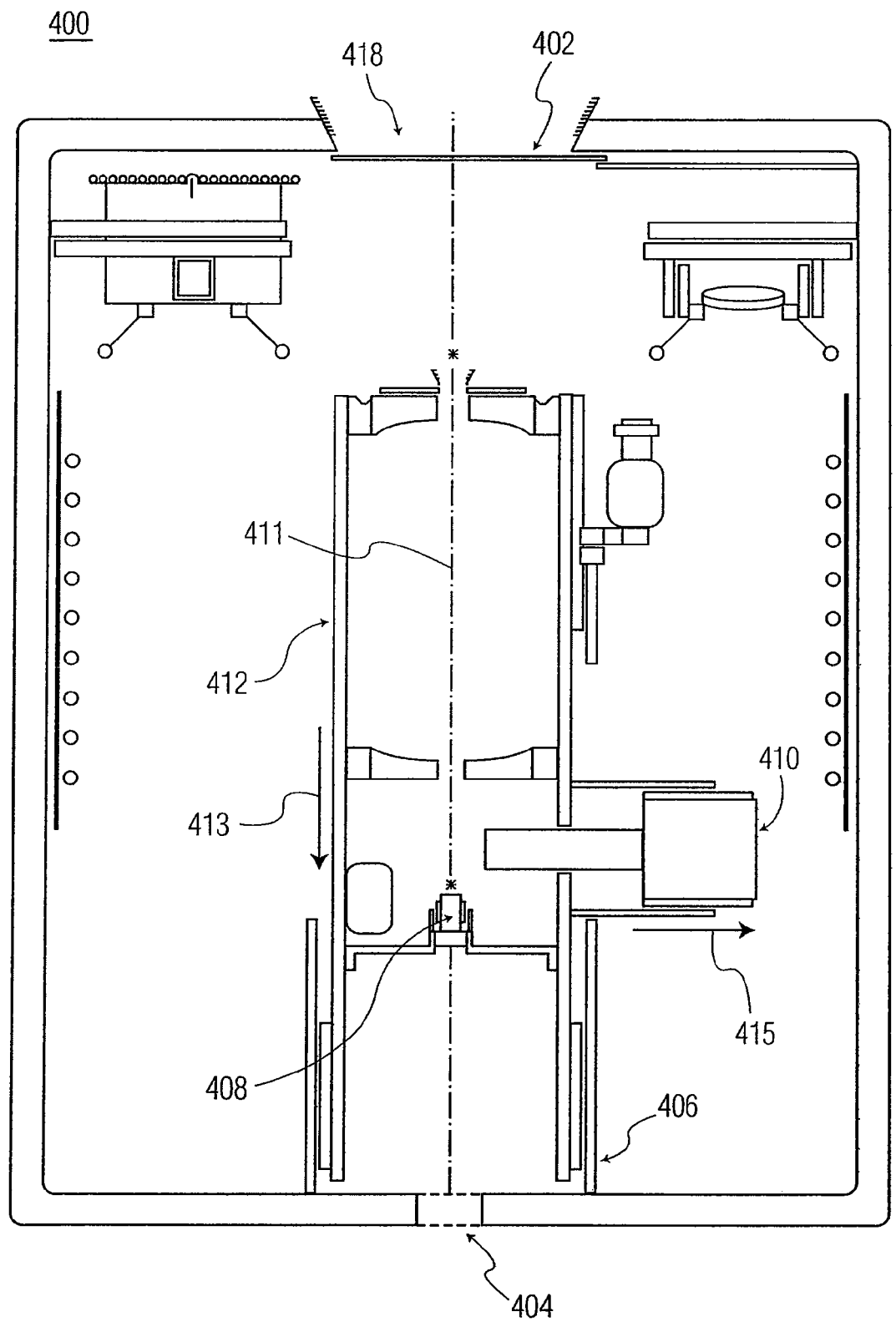
FIG. 4 is a diagram of a center of curvature system showing a fine alignment sensor and a null assembly both in a stowed position in accordance with an embodiment of the invention.

FIG. 4 shows one embodiment of a center of curvature system 400 for testing an optical surface (not shown), such as the reflecting surface of a primary mirror of a telescope. Center of curvature system 400 includes fine alignment sensor 410, null assembly 412 and elevator 406. Center of curvature system 400 further includes focusing objective 408, aperture 404 and thermal shutter 402. Thermal shutter 402 is shown in a closed position.

In FIG. 4, center of curvature system 400 is in a stowed configuration. As shown, fine alignment sensor 410 is in a stowed position that is away from axis 411 and null assembly 412 is in a stowed position when lowered by elevator 406 to a position away from aperture 418. The stowed positions are indicated, respectively, by the two arrows designated as 413 and 415.

Figure 5:
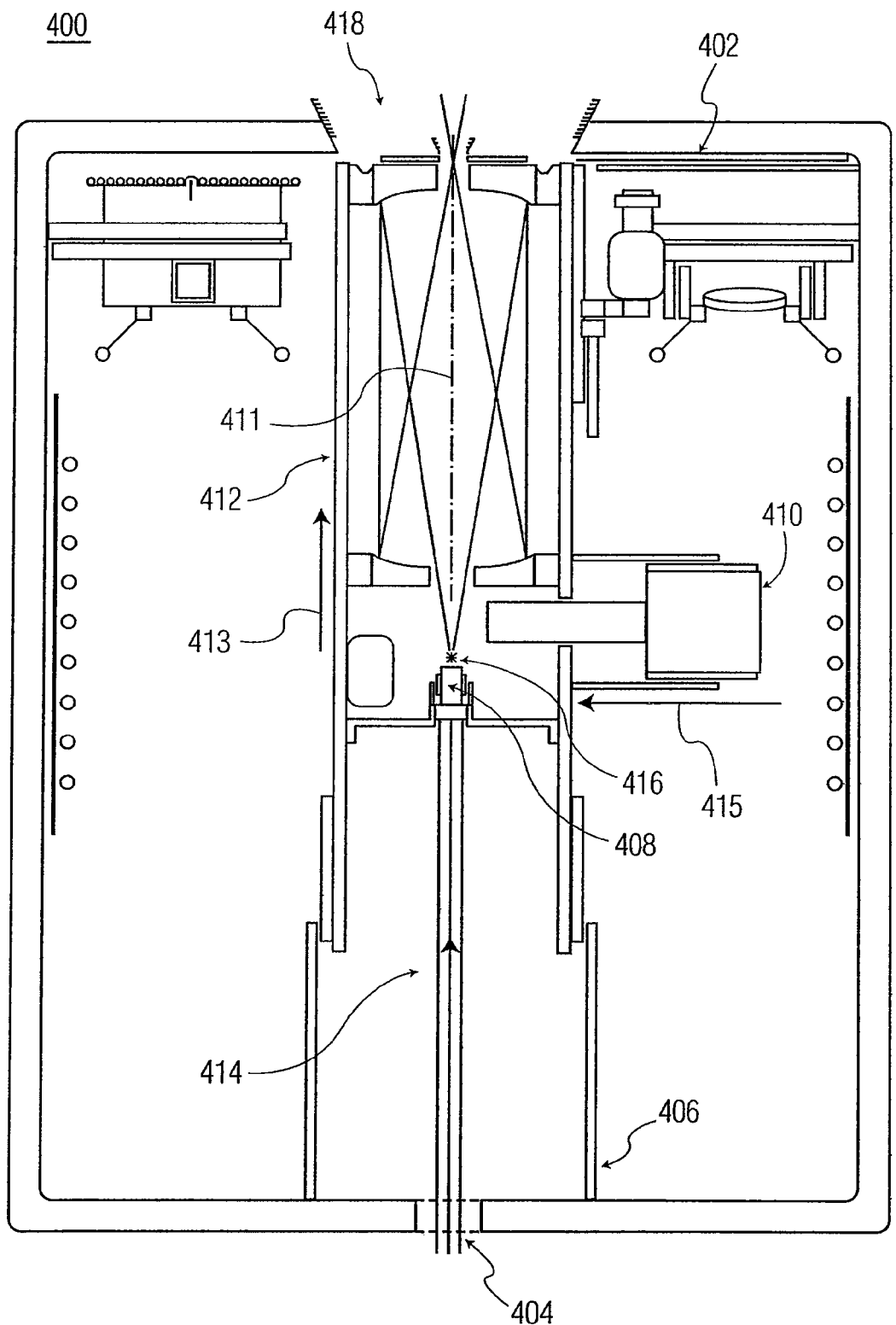
FIG. 5 is a diagram of the center of curvature system showing the fine alignment sensor in a stowed position and the null assembly in a deployed position in accordance with an embodiment of the invention.

Referring next to FIG. 5, fine alignment sensor 410 is still in its stowed position. Null assembly 412, however, is shown lifted by elevator 406 into a deployed position, as indicated by arrow 413. The light rays 414 from an interferometer (not shown) are configured to enter center of curvature system 400 via aperture 404 and pass through Petzval focusing objective 408 to form focal point 416. Light rays diverging from focal point 416 enter null assembly 412. The operation of null assembly 412 is described below. After passing through null assembly 412, the light rays exit center of curvature system 400 via aperture 418 if thermal shutter 402 is retracted, as shown. The rays exit aperture 418 and reach the surface under test, such as a large segmented mirror.

Figure 6:
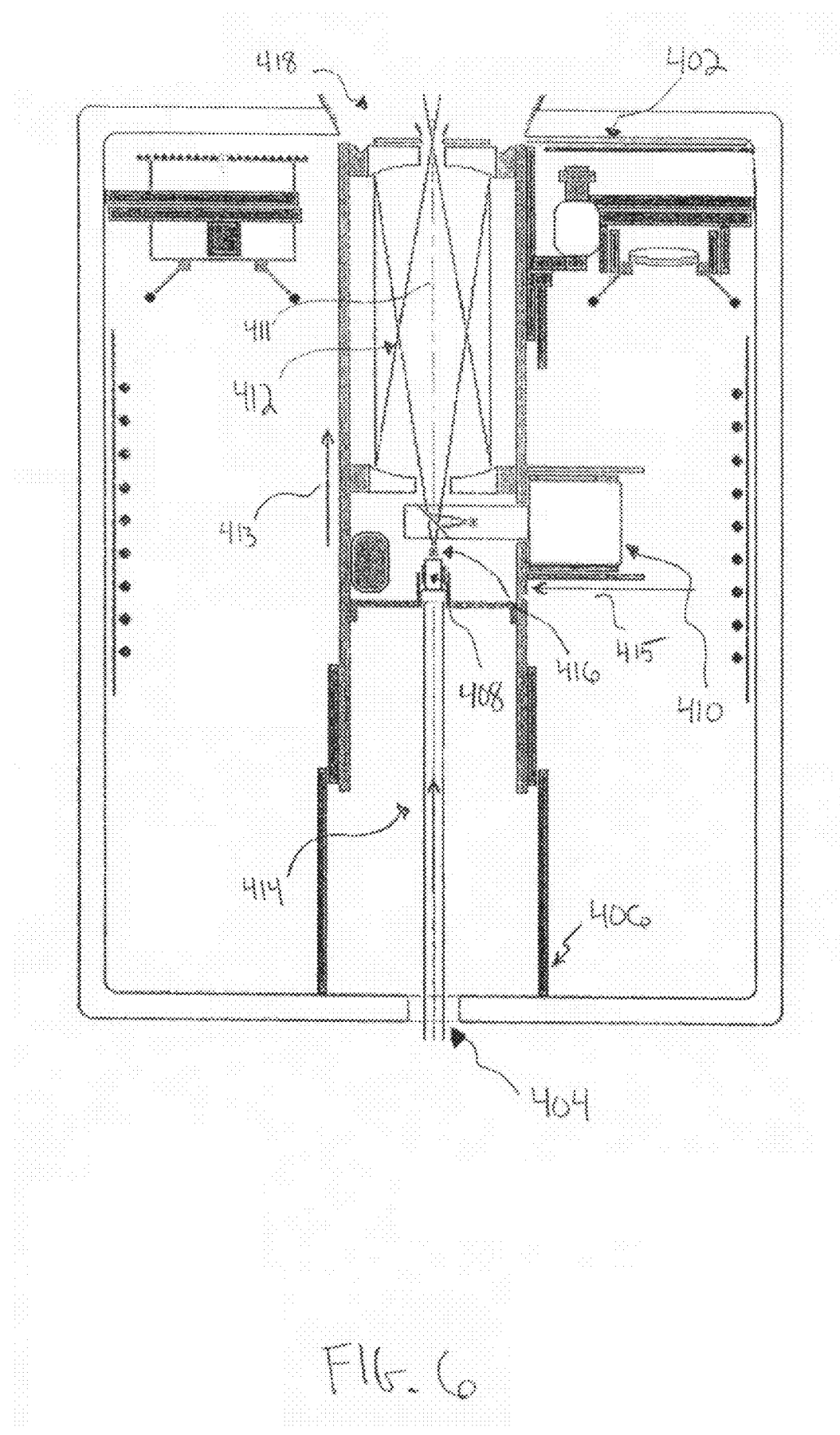
FIG. 6 is a diagram of the center of curvature system showing the fine alignment sensor and the null assembly both in a deployed position in accordance with an embodiment of the invention.

Referring next to FIG. 6, fine alignment sensor 410 is shown in its deployed position. When deployed, fine alignment sensor 410 uses light beam 414 emerging from the interferometer (not shown) to align the segmented mirror. The light rays 414 pass through Petzval focusing objective 408 to form focal point 416. The light rays diverging from focal point 416 pass through a portion of fine alignment sensor 410 (described below) and enter null assembly 412. After passing through null assembly 412, the light rays exit center of curvature system 400 via aperture 418, when thermal shutter 402 is retracted as shown. The rays eventually reach the surface under test. The light rays 414 are then reflected from the surface under test back into null assembly 412. As will be described below with regard to FIG. 7, the reflected light rays enter fine alignment sensor 410.

Figure 7:
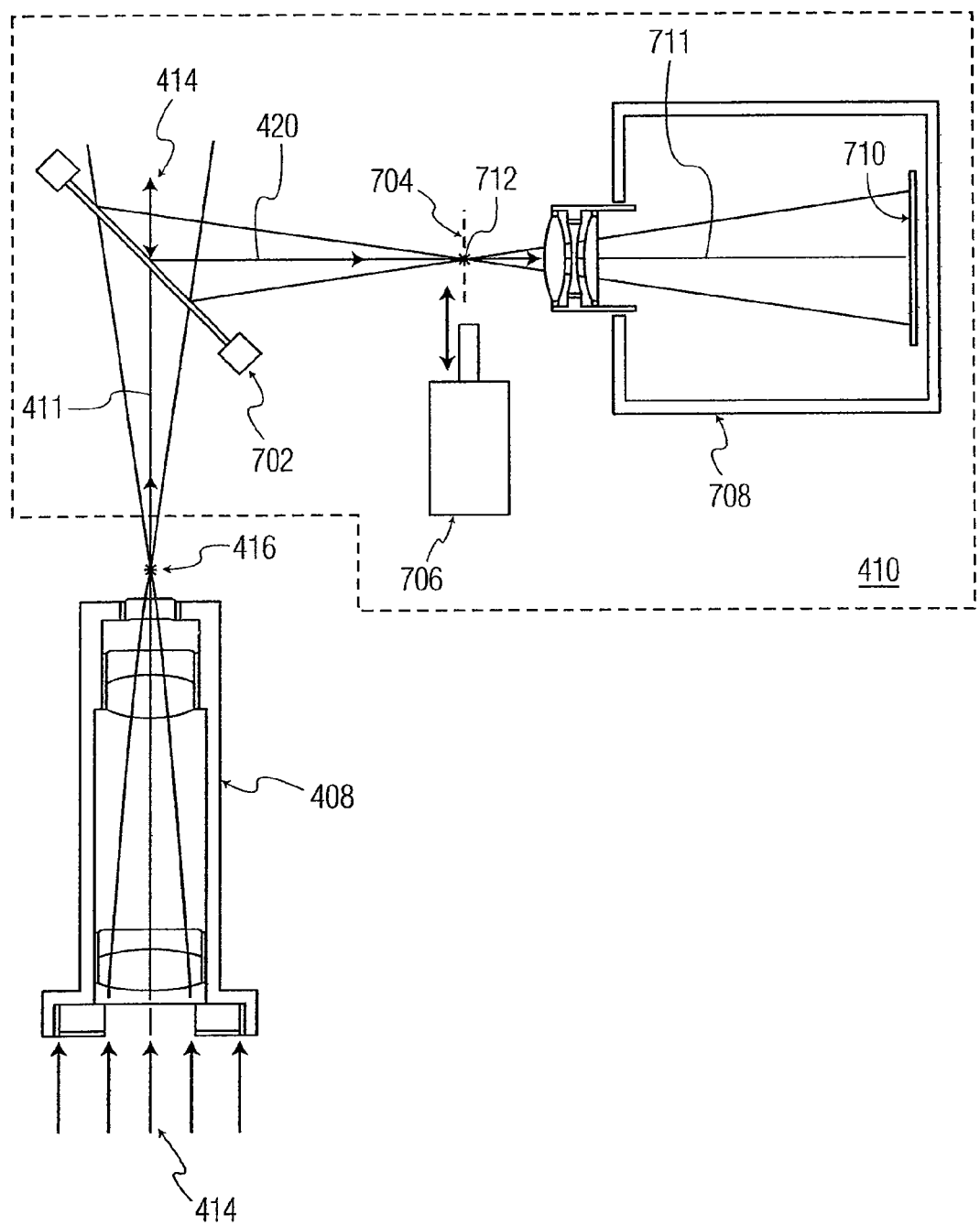
FIG. 7 is a detailed diagram showing the fine alignment sensor in a deployed position relative to the null assembly in accordance with an embodiment of the invention.

Referring now to FIG. 7, there is shown greater detail of fine alignment sensor 410 in its deployed position. As shown, fine alignment sensor 410 includes beamsplitter 702, shown positioned to intercept light rays 414 diverging from focal point 416. Pupil imaging camera 708 is positioned to intercept light rays emerging from beamsplitter 702 on axis 711, which is perpendicular to axis 411. Pupil imaging camera 708 is shown laterally displaced from the beamsplitter. The imaging camera includes an imaging planar array, such as a charge-coupled device (CCD) array 710, for example, for providing light intensity patterns formed by the mirror under test. The Foucault knife-edge 704 is positioned to perpendicularly cut the light beams in axis 711. The Foucault knife-edge 704 cuts the light at a focal point designated as 712. The motion of the knife-edge is controlled by knife-edge translation stage 706.

In operation, light rays 414 enter center of curvature system 400 via aperture 404 (FIG. 6) and pass through Petzval focusing objective 408 to form focal point 416. With fine alignment module 410 in its deployed position, light rays 414 pass through beamsplitter 702 and enter null assembly 412 (FIG. 6), eventually reaching the surface under test, such as the large segmented mirror (shown in FIG. 10).

The light rays 414 are then reflected from the surface of the mirror back into null assembly 412. The reflected light rays enter beamsplitter 702, which partially reflects the light rays to form aberrated return beam 420. Aberrated return beam 420 then passes the cutting plane along focal point 712. The motion of Foucault knife-edge test 704, controlled by knife-edge translation stage 706, cuts return beam 420. Aberrated return beam 420, sequentially occluded and not-occluded by the knife-edge, enters pupil imaging camera 708, to be imaged by CCD array 710.

Figure 8:
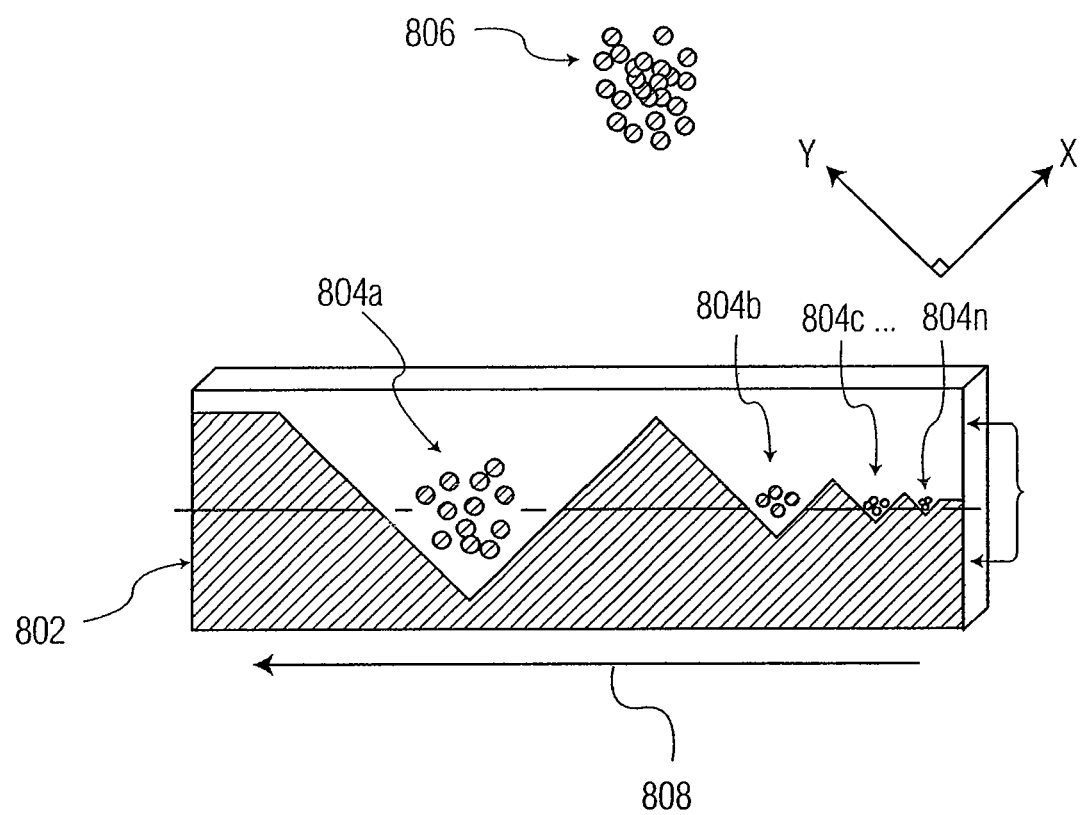
FIG. 8 shows a Foucault knife-edge test assembly in accordance with an embodiment of the invention.

FIG. 8 shows a Foucault knife-edge in accordance with an embodiment of the invention, generally designated as 802. Knife-edge 802 is an opaque surface including a plurality of V-shaped edges that are perpendicular to each other to form a series of successive apexes to the Z-axis. The first V-shaped edge 804*a* is larger than the adjacent V-shaped edge 804*b*. V-shaped edge 804*b* is larger than the adjacent V-shaped edge 804*c*, and so on, up to V-shaped edge 804*n*.

Operationally, an aligned segmented mirror, in which all segments behave as an ideal mirror, would return a single spot to the focal point 712. When the segmented mirror is not aligned, however, the light rays returned from the mirror form separate spots 806 for each misaligned segment of the segmented mirror. The spots are occluded by the opaque surface of the knife-edge, when the opaque surface is positioned to cut the light rays of aberrated return beam 420. When the knife-edge does not cut the light rays, the light rays are not occluded and pass onto the imaging camera. FIG. 8 shows a sequence of light rays as spots 804*a*, 804*b*, 804*c*, up to 804*n*, which become sequentially a single cluster of spots (or a single spot) as the segmented mirror is tilt-adjusted to behave like a single mirror.

Knife-edge 802 is incrementally driven in the X,Y plane so that the cluster of spots 806 arriving in the Z-plane along axis 711 (FIG. 7) gradually progresses from a state of complete non-occlusion to a state of complete occlusion as the V-shaped edges become smaller. As shown by arrow 808, the largest V-shaped edge is introduced first into the aberrated return beam 420, and the smallest V-shaped edge is introduced last.

Smaller V-shaped edges of knife-edge 802 are introduced as the segmented mirror is adjusted into fine alignment, ultimately resulting in the spots being coincident at focal point 712. As each spot of light 806 is occluded by knife-edge 802, it is possible to determine its vector location and thus align the mirror segments to form a single focal point. Once focus is achieved, fine sensing module 410 may be retracted into its stowed position and light rays 414 from the interferometer may be used to interrogate the segmented mirror for further testing.

Figure 11D:
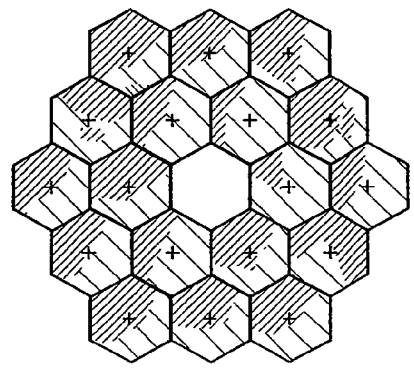
FIGS. 11A-11P show intensity patterns resulting from using the Foucault knife-edge test assembly of FIG. 8, illustrating occluded and non-occluded light beams incident on an imaging camera of the fine alignment sensor in accordance with an embodiment of the invention.
Figure 11C:
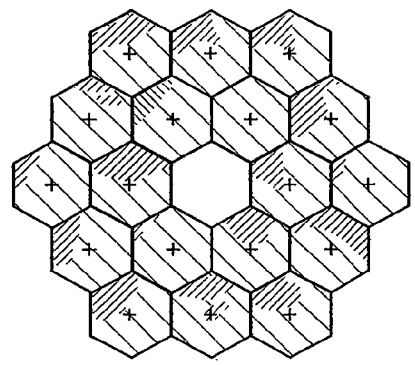
Figure 11B:
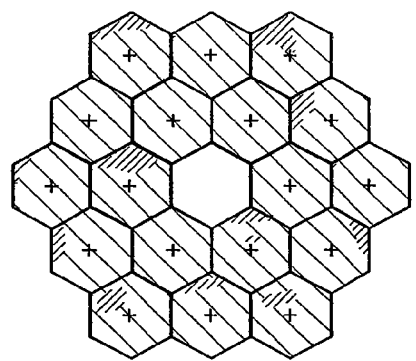
Figure 11A:
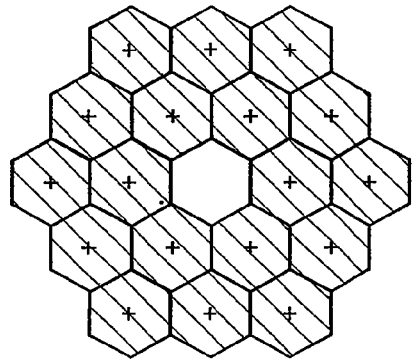
Figure 11H:
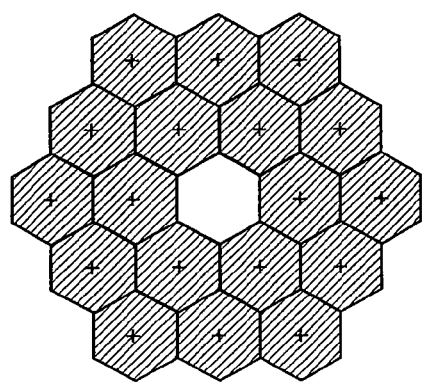
Figure 11G:
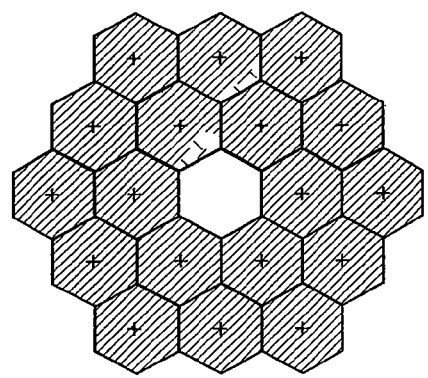
Figure 11F:
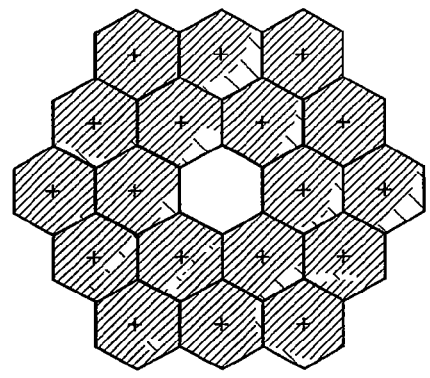
Figure 11E:
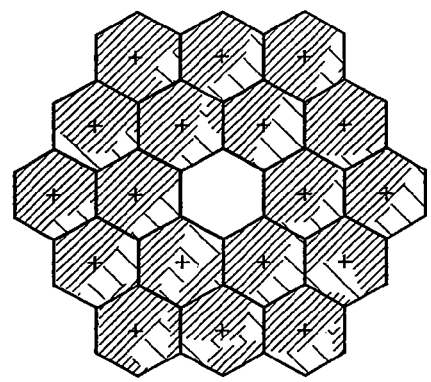
Figure 11L:
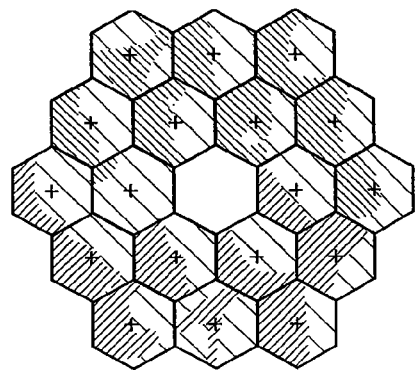
Figure 11K:
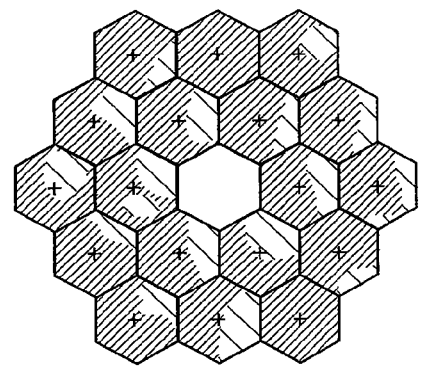
Figure 11J:
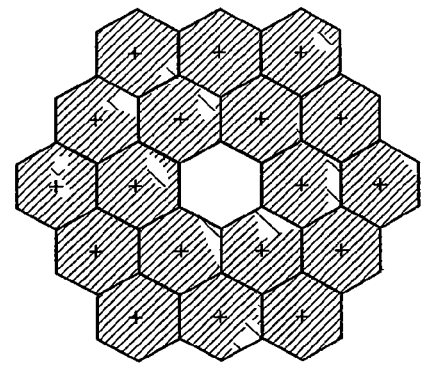
Figure 11I:
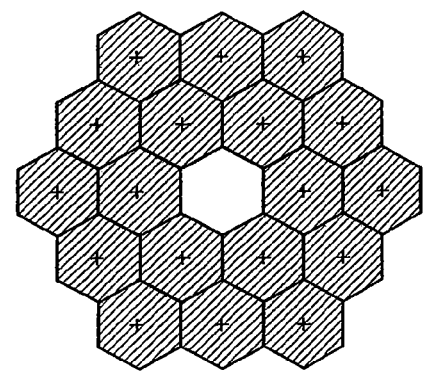
Figure 11P:
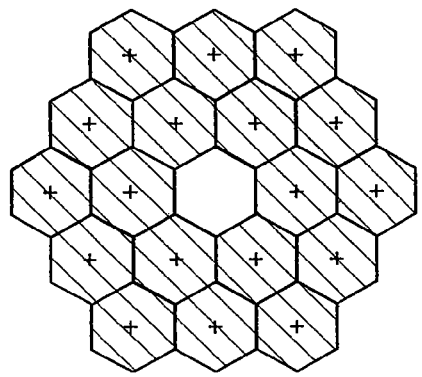
Figure 11O:
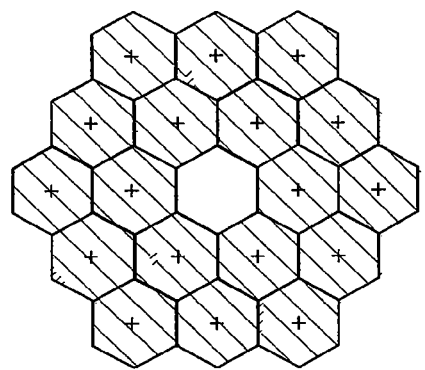
Figure 11N:
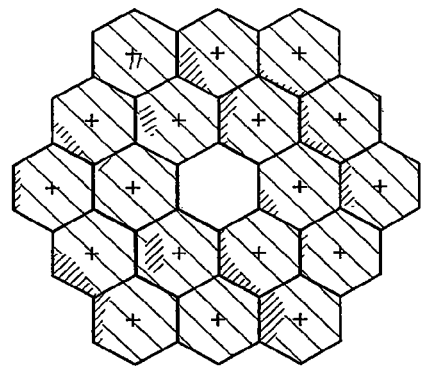
Figure 11M:
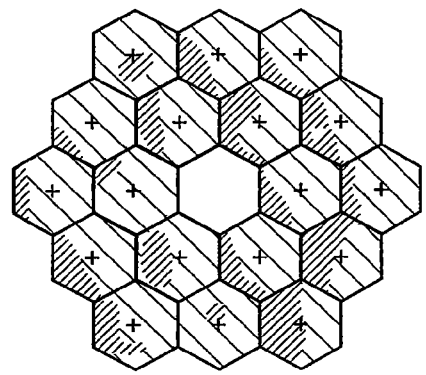

The pupil imaging camera images the spots passed between the V-shaped edges of the knife-edge. FIGS. 11A-11P show the spots as the Foucault knife-edge sequentially occludes and does not occlude the light beams. In FIG. 11A, the light beams are completely not occluded and in FIG. 11H, the light beams are completely occluded. As the knife-edge is introduced into the aberrated return beam 420 and as the V-shaped edges become sequentially smaller, more light beams are occluded by the knife-edge. FIGS. 11-11P show the opaque surface of the knife-edge sequentially moving out of the light beam so that the light beam is completely occluded, as shown in FIG. 11I, and is completely noon-occluded, as shown in FIG. 11P.

Figure 9:
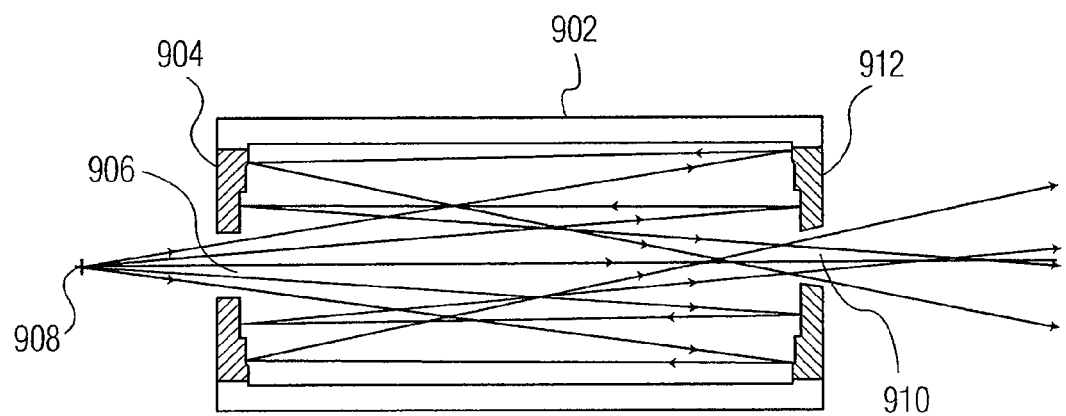
FIG. 9 shows a null assembly for testing an optical surface, including an aspheric mirror and a spherical imaging mirror.

FIG. 9 shows an exemplary null assembly 902. Null assembly 902 includes aspheric mirror 912 and spherical imaging mirror 904. The spherical imaging mirror 904 images the reflecting surface of aspheric mirror 912 either near or onto the optical surface under test (not shown). Spherical imaging mirror 904 is disposed between a light source (not shown) and aspheric mirror 912. Aspheric mirror 912 is disposed between spherical imaging mirror 904 and the optical test surface.

In this exemplary embodiment, light from a light source is focused on to focal point 908. Light rays diverging from focal point 908 enter through aperture 906 in spherical imaging mirror 904. Most of the rays from focal point 908, after passing through aperture 906, reflect off the surface of aspheric mirror 912, and travel back to spherical imaging mirror 904. The rays are then reflected in the other direction through aperture 910 in aspheric mirror 912, eventually reaching the surface under test.

After reflecting from the surface under test, the light rays re-enter null assembly 902 by passing through aperture 910 in aspheric mirror 912, next reflecting from spherical imaging mirror 904 and then reflecting from aspheric mirror 912 to pass through aperture 906 for further processing.

Figure 10:
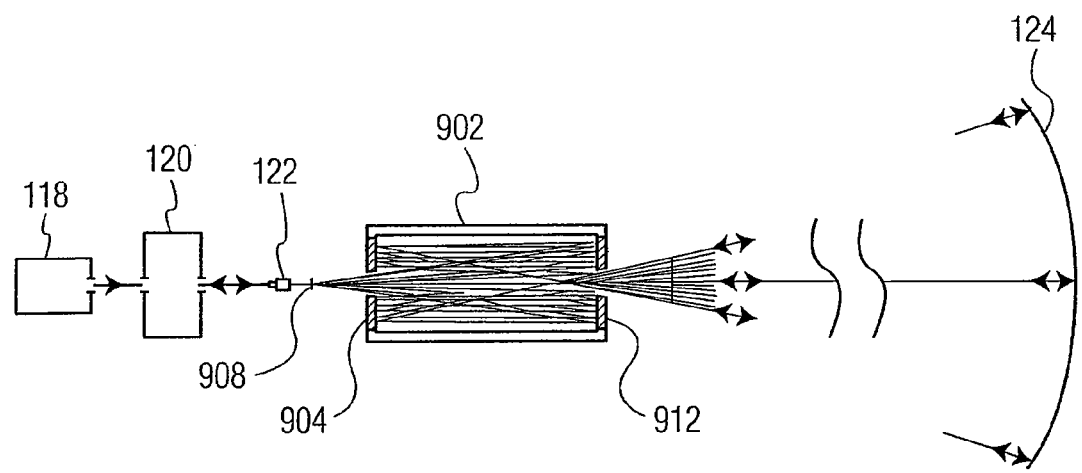
FIG. 10 shows a system for testing an optical surface that includes the null assembly shown in FIG. 9.

FIG. 10 shows an exemplary embodiment of a system for testing an optical surface that includes null assembly 902. In this embodiment, light from light source 118, such as a laser, enters an optical measuring device 120 such as an interferometer. Light emerging from optical measuring device 120 is collimated and focused on to focal point 908 by focusing optics 122, which may include a focusing mirror or an objective lens. After being focused, the light propagates through null assembly 902 and then impinges onto mirror surface 124 that is under test. After reflecting from mirror surface 124, the light propagates through null assembly 902 and eventually re-enters optical measuring device 120. If optical measuring device 120 is an interferometer (as it is in the embodiment shown in FIGS. 4-6), light from the light source 118 and light reflected from the optical surface 124 interfere with each other within the interferometer. The resulting interference pattern may provide a map of deviations for mirror surface 124 as compared to an ideal surface. It will be appreciated that focal point 908 may be focal point 416 shown in FIGS. 4-7.

Alternative embodiments may have light from the light source 118 entering null assembly 902, not through optical measuring device 120, but through some other means. Such means may include an additional focusing optic and other optical apparatus such as beam splitters or mirrors. In this case the light reflected from surface 124 may also enter the optical measuring device 120 as in FIG. 10. For example, optical measuring device 120 may be a wavefront shearing interferometer, a Shack-Hartmann wavefront sensor, a phase diversity sensor or any other single pass optical measuring device. In addition, the system may include fine alignment module 410 that may have a null assembly or focusing optics.

Ideally, the optical system is achromatic, or as nearly so as possible. Because the system does not have elements with any appreciable chromatic dispersion, null assembly 902 and optical measuring device 120 may use white light, multi-spectral light, multi-wavelength light, or broadband light without degradation due to chromatic aberration or other forms of degradation in the interference pattern. In general, any portion of the electromagnetic spectrum, either in part or in whole, may be used.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for aligning a segmented mirror comprising
   a source of radiation directed along a first axis to the segmented mirror,
   a beamsplitter removably inserted along the first axis for redirecting radiation from the first axis to a second axis, substantially perpendicular to the first axis,
   an imaging array positioned along the second axis for imaging the redirected radiation, and
   a knife-edge configured for cutting the redirected radiation,
   wherein the knife-edge is serially positioned to occlude and not occlude the redirected radiation, effectively providing a variable radiation pattern detected by the imaging array for aligning the segmented mirror.

2. The system of claim 1 wherein
   the beamsplitter, the imaging array and the knife-edge are integrated into a housing, and
   the housing is configured for removably inserting the beamsplitter along the first axis.

3. The system of claim 1 wherein
   the knife edge is mechanically coupled to a translation stage, and
   the translation stage is configured to move the knife edge in a plane perpendicular to the second axis.

4. The system of claim 1 including
   a focusing objective for focusing the radiation directed along the first axis onto a point on the first axis,
   wherein the point is located between the beamsplitter and the focusing objective.

5. The system of claim 1 wherein
   the source of radiation includes an interferometer configured to radiate the radiation along the first axis.

6. The system of claim 1 including
   a null assembly positioned along the first axis, and located between the beamsplitter and the segmented mirror,
   wherein the null assembly is configured to receive radiation from the source and reflect the radiation toward the segmented mirror.

7. The system of claim 1 including
   a focusing objective for focusing the radiation directed along the first axis onto a point on the first axis, wherein the point is located between one surface of the beamsplitter and the focusing objective, and
   a null assembly positioned along the first axis, and located between another surface of the beamsplitter and the segmented mirror, wherein the null assembly is configured to receive radiation from the point on the first axis and reflect the radiation toward the segmented mirror,
   wherein a position of the source of radiation is adjustable along a length of the first axis, based on the variable radiation pattern detected by the imaging array.

8. The system of claim 7 wherein
   the beamsplitter, the imaging array and the knife-edge are integrated into a housing, and
   the housing is configured for removably inserting the beamsplitter along the first axis.

9. The system of claim 1 wherein
   the knife-edge includes an opaque surface disposed in a plane perpendicular to the second axis.

10. The system of claim 9 wherein
    the knife-edge includes a plurality of V-shaped edges, each edge configured for cutting radiation along the second axis, and
    the adjoining edges are oriented perpendicular to each other.

11. A Foucault knife-edge test assembly comprising
    a beam of radiation directed along a Z-axis of an orthogonal X, Y, Z coordinate system, and
    a knife-edge having an opaque surface disposed in an X, Y plane including a plurality of V-shaped edges, each edge configured for cutting the beam of radiation along the Z-axis, and
    adjoining edges of the V-shaped edges are oriented perpendicular to each other to form a series of successive apexes; and
    a source of radiation directed along a primary axis to a segmented mirror,
    a beamsplitter removably inserted along the primary axis for redirecting radiation from the primary axis to the Z-axis and forming the beam of radiation, wherein the Z-axis is substantially perpendicular to the primary axis,
    an imaging array positioned along the second axis for imaging the beam of radiation, and
    the opaque surface of the knife-edge configured for cutting the beam of radiation, wherein the knife-edge is serially positioned to occlude and not occlude the beam of radiation, effectively providing a variable radiation pattern detected by the imaging array for aligning the segmented mirror.

12. The Foucault knife-edge test assembly of claim 11 wherein the V-shaped edges are disposed in the X,Y plane, and
    a first diagonal extending from a first apex to the Z-axis is larger than an adjacent second diagonal extending from a second apex to the Z-axis.

13. The system of claim 11 wherein
    the beamsplitter, the imaging array and the knife-edge are integrated into a housing, and
    the housing is configured for removably inserting the beamsplitter along the primary axis and detecting the beam of radiation by the imaging array.

14. The system of claim 11 wherein
    the source of radiation is an interferometer moveable along the primary axis, and
    the interferometer is moved along the primary axis, in response to the radiation pattern detected by the imaging array.

15. The system of claim 11 wherein
    the knife edge is mechanically coupled to a translation stage, and
    the translation stage is configured to move the knife edge in a plane perpendicular to the Z-axis.

16. A method of aligning a segmented mirror comprising the steps of:
    (a) directing radiation from a source along a first axis to the segmented mirror;
    (b) temporarily positioning a beamsplitter along the first axis for redirecting radiation from the first axis to a second axis, which is substantially perpendicular to the first axis;
    (c) serially positioning a knife-edge to cut the redirected radiation along the second axis;
    (d) imaging radiation along the second axis, after the radiation is cut by the knife-edge; and
    (e) aligning the segmented mirror and/or moving the source with respect to the first axis, in response to the imaging step.

17. The method of claim 16 wherein the step of imaging includes providing a variable radiation pattern detected by an imaging array for use in aligning the segmented mirror.

18. The method of claim 16 wherein the step of imaging includes observing a variable radiation pattern by a human eye during alignment of the segmented mirror.

19. The method of claim 16 wherein the step of temporarily positioning includes moving the beamsplitter into the first axis for redirecting the radiation to the second axis, when performing the step of aligning the segmented mirror, and moving the beamsplitter away from the first axis, after completing the step of aligning the segmented mirror.

20. The method of claim 16 wherein the step of serially positioning the knife-edge includes moving an opaque surface having a plurality of V-shaped edges to sequentially occlude and not occlude the redirected radiation.

21. The method of claim 16 wherein step (e) includes moving the source, the source being an interferometer used for interrogating the segmented mirror; and after performing step (e), positioning the beamsplitter away from the first axis, and interrogating the segmented mirror along the first axis using the interferometer.

* * * * *